United States Patent
Zhao et al.

(10) Patent No.: US 11,593,307 B2
(45) Date of Patent: Feb. 28, 2023

(54) METHOD, DEVICE AND COMPUTER PROGRAM PRODUCT FOR MANAGING STORAGE SPACES

(71) Applicant: EMC IP Holding Company LLC, Hopkinton, MA (US)

(72) Inventors: Chaojun Zhao, Chengdu (CN); Hongyuan Zeng, Sichuan (CN); Kai Li, Chengdu (CN); Shuangshuang Liang, Zunyi Ci (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 180 days.

(21) Appl. No.: 16/935,974

(22) Filed: Jul. 22, 2020

(65) Prior Publication Data
US 2021/0216505 A1 Jul. 15, 2021

(30) Foreign Application Priority Data
Jan. 15, 2020 (CN) .......................... 202010043305.6

(51) Int. Cl.
*G06F 17/00* (2019.01)
*G06F 16/17* (2019.01)
(Continued)

(52) U.S. Cl.
CPC .......... *G06F 16/1727* (2019.01); *G06N 5/04* (2013.01); *G06N 20/00* (2019.01)

(58) Field of Classification Search
CPC .. G06F 16/1727; G06F 3/0629; G06F 3/0644; G06F 3/0608; G06F 3/064; G06N 5/04; G06N 20/00; G06K 9/6223
See application file for complete search history.

(56) References Cited

U.S. PATENT DOCUMENTS 5,802,599 A * 9/1998 Cabrera ................ G06F 3/0611
711/170
8,250,327 B2 * 8/2012 Fujii ..................... G06F 3/0614
711/170
(Continued)

OTHER PUBLICATIONS

Seungwoo Ryu, Chul Lee, Sanghyun Yoo, and Sungjong Seo. 2010. Flash-aware cluster allocation method based on filename extension for FAT file system. In Proceedings of the 2010 ACM Symposium on Applied Computing (SAC '10). Association for Computing Machinery, New York, NY, USA, 502-509, March (Year: 2010).*

(Continued)

*Primary Examiner* — Greta L Robinson
(74) *Attorney, Agent, or Firm* — BainwoodHuang

(57) ABSTRACT

Techniques to manage storage spaces involve: determining an allocation rate of a storage pool based on a size of a storage space of the storage pool and sizes of allocated spaces for file systems from the storage space; determining a threshold allocation rate of the storage pool based on the size of the storage space of the storage pool; in accordance with a determination that the allocation rate of the storage pool is greater than the threshold allocation rate, determining a target file system from the file systems based on sizes of unused portions of the allocated spaces for the file systems; and releasing an unused portion of an allocated space for the target file system. Accordingly, the efficiency of space release of a storage system can be improved and the adverse impact of the space release process on the performance of the storage system can be reduced.

20 Claims, 6 Drawing Sheets

(51) Int. Cl.
*G06N 5/04* (2023.01)
*G06N 20/00* (2019.01)

(56) References Cited

U.S. PATENT DOCUMENTS

| | | | |
|---|---|---|---|
| 8,521,987 | B2 | 8/2013 | Iwamitsu et al. |
| 9,383,924 | B1 | 7/2016 | Fullbright et al. |
| 10,346,057 | B1* | 7/2019 | Martin ............... G06F 3/0665 |
| 10,678,456 | B2 | 6/2020 | Chen et al. |
| 11,023,128 | B2 | 6/2021 | Pabon |
| 11,188,462 | B2* | 11/2021 | Huang ............... G06F 12/063 |
| 2012/0323970 | A1* | 12/2012 | Larson ............... G06F 16/9014 |
| | | | 707/E17.011 |
| 2017/0242611 | A1* | 8/2017 | Callahan ............ G06F 3/0644 |
| 2021/0117378 | A1* | 4/2021 | Zhao ................. G06F 16/162 |

OTHER PUBLICATIONS

Yuzhao Wang, Lele Li, You Wu, Junqing Yu, Zhibin Yu, and Xuehai Qian. TPShare: a time-space sharing scheduling abstraction for shared cloud via vertical labels. In Proceedings of the 46th International Symposium on Computer Architecture (ISCA '19). Association for Computing Machinery, 499-512, June (Year: 2019).*

Wenting He et al., Hadoop+: Modeling and Evaluating the Heterogeneity for MapReduce Applications in Heterogeneous Clusters. In Proceedings of the 29th ACM on International Conference on Supercomputing (ICS '15). Association for Computing Machinery, 143-153. June (Year: 2015).*

Ramya Raghavendra et al., Unifying HDFS and GPFS: Enabling Analytics on Software-Defined Storage. In Proceedings of the 17th International Middleware Conference, Association for Computing Machinery, Article 3, 1-13, NOV.,<https://doi.org/10.1145/2988336.2988339> (Year: 2016).*

Hong Tang et al., A Self-Organizing Storage Cluster for Parallel Data-Intensive Applications. In Proceedings of the 2004 ACM/IEEE conference on Supercomputing, IEEE Computer Society, 13 pages, <https://doi.org/10.1109/SC.2004.9>, Nov. (Year: 2004).*

* cited by examiner

METHOD, DEVICE AND COMPUTER PROGRAM PRODUCT FOR MANAGING STORAGE SPACES

CROSS-REFERENCE TO RELATED APPLICATION

This application claims priority to Chinese Patent Application No. CN202010043305.6, on file at the China National Intellectual Property Administration (CNIPA), having a filing date of Jan. 15, 2020, and having "METHOD, DEVICE AND COMPUTER PROGRAM PRODUCT FOR MANAGING STORAGE SPACES" as a title, the contents and teachings of which are herein incorporated by reference in their entirety.

FIELD

Embodiments of the present disclosure generally relate to the field of storage, and more specifically, to a method, device and computer program products for managing storage spaces.

BACKGROUND

In current storage systems, if storage spaces actually used by stored file systems are less than allocated storage spaces and this situation lasts for a period of time, the system will trigger space release of the file systems (also referred to as shrinkage of the file systems). However, the space release process of the file system often encounters the problem of data unavailability, and this process is very time-consuming. Too frequent space releases can also cause shaking of the file system, that is, the situation of switching between space release and space extension, which is undesirable.

SUMMARY

Embodiments of the present disclosure provide a method, device and computer program product for managing storage spaces.

In a first aspect of the present disclosure, there is provided a method of managing storage spaces. The method includes: determining an allocation rate of a storage pool based on a size of a storage space of the storage pool and sizes of allocated spaces for a plurality of file systems from the storage space; determining a threshold allocation rate of the storage pool based on the size of the storage space of the storage pool; in accordance with a determination that the allocation rate of the storage pool is greater than the threshold allocation rate, determining a target file system from the plurality of file systems based on sizes of unused portions of the allocated spaces for the plurality of file systems; and releasing an unused portion of an allocated space for the target file system.

In a second aspect of the present disclosure, there is provided an electronic device. The electronic device includes at least one processing unit and at least one memory coupled to the at least one processing unit and storing instructions for execution by the at least one processing unit, the instructions, when executed by the at least one processing unit, causing the electronic device to perform acts, the acts including: determining an allocation rate of a storage pool based on a size of a storage space of the storage pool and sizes of allocated spaces for a plurality of file systems from the storage space; determining a threshold allocation rate of the storage pool based on the size of the storage space of the storage pool; in accordance with a determination that the allocation rate of the storage pool is greater than the threshold allocation rate, determining a target file system from the plurality of file systems based on sizes of unused portions of the allocated spaces for the plurality of file systems; and releasing an unused portion of an allocated space for the target file system.

In a third aspect of the present disclosure, there is provided a computer program product tangibly stored on a non-transitory computer-readable medium and including machine executable instructions, the machine executable instructions, when executed by a device, cause the device to perform the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

In various figures, the same or corresponding reference numerals indicate the same or corresponding parts.

DETAILED DESCRIPTION OF EMBODIMENTS

Figure 1:
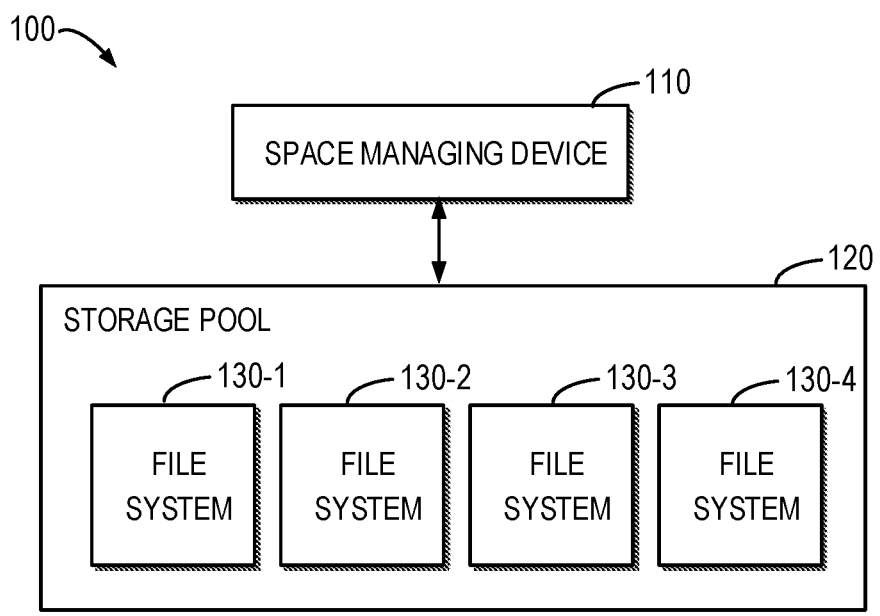
FIG. 1 illustrates a block diagram of an example space managing system in which embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure will be described in more detail below with reference to the drawings. Although the drawings illustrate embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text also can include other explicit and implicit definitions.

As mentioned above, in current storage systems, the space release of the file system is triggered according to a threshold of used space and duration set for the file system. In other words, the system uses a detector to check the status of the file system periodically, for example, every 2 minutes. If it is detected that the space actually used by the file system is less than the allocated space allocated to the file system for a period of time, for example, one hour, the space release process of the file system will be triggered.

The automatic space release of a file system is a main method for improving the storage efficiency of the storage system. However, due to the large number of internal IOs, race conditions, conflicting lock states, and operation cancellation that occur during this process, it is easy to encounter the data unavailability (DU) problem of the storage array during the space release process. In some cases, the function of file system space release on the storage array has to be disabled to maintain system stability.

In addition, the space release process of the file system is very time-consuming because it will consume some internal IOs to reorganize the blocks to reclaim and reallocate the released space. Additional locks will be used to avoid conflict with other space management processes and host IOs. Moreover, there will be overheads for the metadata update of the file system. All of those will affect the performance of the storage system.

Therefore, on one hand, it is desired to reclaim as much unused portion of the storage space as possible, on the other hand, it is undesired that the release and reallocation of the storage space is triggered too frequently. Although dynamic space threshold and duration for individual file systems have been implemented to avoid shaking of file system. However, since the space threshold and duration are determined according to individual file systems, the space release may be optimized for the individual file system itself, but it may not be optimized for the entire storage pool where the file system is located.

Embodiments of the present disclosure propose a solution for managing storage spaces to solve one or more of the above problems and other potential problems. This solution manages the space release process of the file system in a manner of overall optimization, thereby improving the storage efficiency of the entire storage pool without introducing unexpected performance impacts and conflicts.

FIG. 1 illustrates a block diagram of an example space managing system 100 in which embodiments of the present disclosure can be implemented. As shown in FIG. 1, the space managing system 100 includes a space managing device 110 and a storage pool 120. In the storage pool 120, there are file systems 130-1 to 130-4 (collectively referred to as file systems 130). Various methods according to embodiments of the present disclosure may be implemented at the space managing device 110. It should be understood that the structure of the space managing system 100 is described by way of example only, and does not imply any limitation on the scope of the present disclosure. For example, the embodiments of the present disclosure may also be applied to a system different from the space managing system 100. It should be understood that the specific numbers of the above devices are given for illustrative purposes only, and do not imply any limitation on the scope of the present disclosure. For example, the embodiments of the present disclosure may also be applied to more or fewer devices.

The space managing device 110 is a device that determines when to release spaces and for which file systems. The space managing device 110 may be, for example, a computer, a virtual machine, a server, etc., and the present disclosure is not limited in this regard. The storage pool 120 includes a set of storage devices (not shown). The storage device may be, for example, a hard disk, a magnetic disk, a floppy disk, or the like. The storage devices in the storage pool 120 together provide a storage space of the storage pool. This storage space can be allocated to different file systems 130. Each of the file systems 130 may be stored on a single physical storage device in the storage pool 120, or may be stored on a virtual storage device across a plurality of physical storage devices. The present disclosure is not limited in this regard. In some embodiments, the space managing device 110 and the storage pool 120 communicate with each other through a network, and the network may be, for example, an Internet, an intranet, or the like. Alternatively, in other embodiments, the space managing device 110 and the storage pool 120 may be integrated in the same device.

Figure 2:
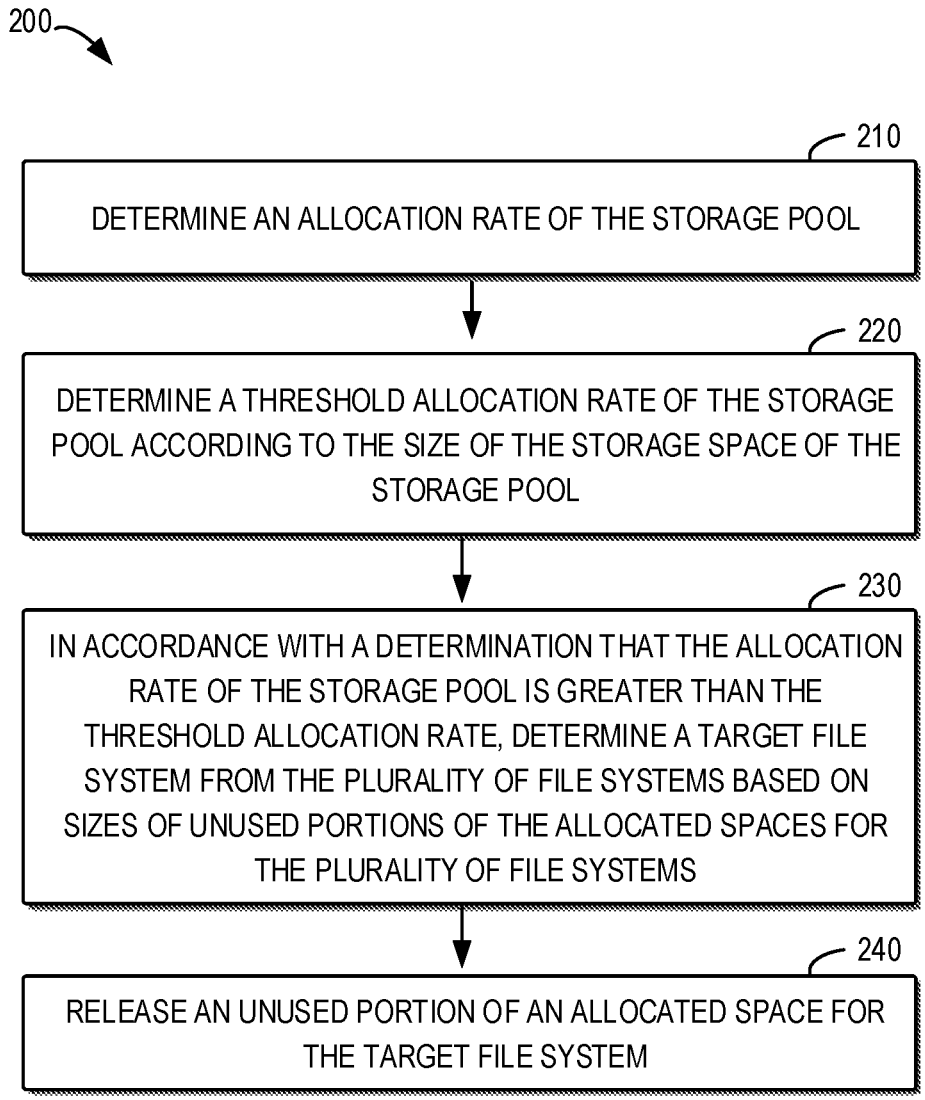
FIG. 2 illustrates a flowchart of an example method of managing storage spaces according to embodiments of the present disclosure.

FIG. 2 illustrates a flowchart of an example method 200 of managing storage spaces according to embodiments of the present disclosure. For example, the method 200 may be performed by the space managing device 110 shown in FIG. 1. It should be understood that the method 200 may also be performed by other devices, and the scope of the present disclosure is not limited in this regard. It should also be understood that the method 200 may also include additional acts not shown and/or acts shown may be omitted, and the scope of the present disclosure is not limited in this regard.

At 210, the space managing device 110 determines an allocation rate of the storage pool 120. The allocation rate may indicate the degree of the storage space in the storage pool 120 being allocated, and may be determined in various ways. In some embodiments, the space managing device 110 may obtain sizes of allocated spaces for the plurality of file systems 130 from the storage pool 120 and determine the percentage of the sum of these sizes to the size of the storage space of the storage pool 120, and thereby the allocation rate of the storage pool 120 is determined.

At 220, the space managing device 110 determines a threshold allocation rate of the storage pool 120 according to the size of the storage space of the storage pool 120.

In some embodiments, considering that a constant threshold allocation rate, e.g., 75%, is inefficient for a large-capacity storage pool, a threshold allocation rate that varies with the size of the storage space is adopted. For example, assuming a constant 75% as the threshold allocation rate, for a 100 TB storage pool, when the threshold allocation rate is reached, there is still a 250 GB free space (unallocated space). As mentioned above, since the space release process itself will have certain impact on the performance of the storage system, there is no need to perform a subsequent space release process causing potential DU problems or shaking situation, etc., when there is still enough storage space.

In some embodiments, the space managing device 110 may determine whether the size of the storage space of the storage pool is greater than a first space threshold. If it is determined that the size is not greater than the first space threshold, the space managing device 110 sets the threshold allocation rate as a constant first predetermined threshold. Conversely, if it is determined that the size is greater than the first space threshold, the space managing device 110 determines the threshold allocation rate in association with the size of the storage space.

Figure 3:
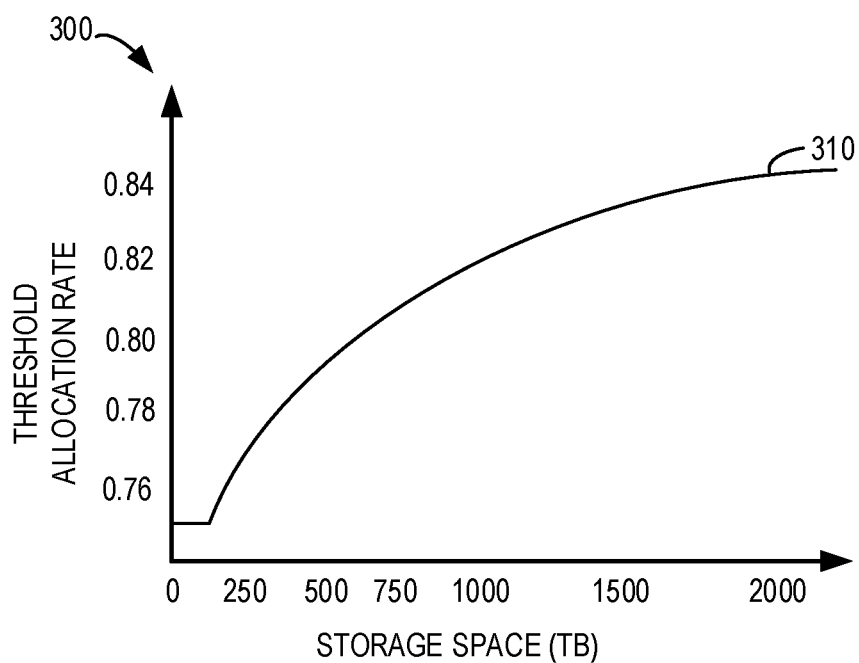
FIG. 3 illustrates a schematic diagram of a threshold allocation rate of a storage pool varying with a size of storage space according to embodiments of the present disclosure.

The relationship between the threshold allocation rate and the storage space is further described below with reference to FIG. 3. FIG. 3 illustrates a schematic diagram 300 of a threshold allocation rate of a storage pool varying with a size of storage space according to embodiments of the present disclosure.

In some embodiments, when the storage space size $P_{size}$ of the storage pool is not greater than 100 TB, the space managing device 110 may set the threshold allocation rate PWM as a constant 75% according to the following formula (1):

$$PWM = 75\% (0 < P_{size} \leq 100 \text{ TB}) \quad (1)$$

Since $PWM = 1 - P_{freespace}/P_{size}$, it can be deduced from formula (1) that when the threshold allocation rate is reached, the free space $P_{freespace}$ in the storage pool is:

$$P_{freespace} = (1-75\%)*P_{size} (0 < P_{size} \leq 100 \text{ TB}) \quad (2)$$

Additionally, in other embodiments, when $P_{size}$ is greater than 100 TB, the space managing device 110 may determine the value of the threshold allocation rate PWM in association with $P_{size}$ according to the following formula (3).

$$PWM = 1 - \frac{25 + (P_{size} - 100)*25\% * \frac{2}{\lg(P_{size})}}{P_{size}} (P_{size} > 100 \text{ TB}) \quad (3)$$

It can be deduced from formula (3) that when the threshold allocation rate is reached, the free space $P_{freespace}$ in the storage pool is:

$$P_{freespace} = 25 + (P_{size} - 100)*25\% * \frac{2}{\lg(P_{size})} (P_{size} > 100 \text{TB}) \quad (4)$$

Additionally, in other embodiments, when the PWM calculated according to formula (3) is greater than 90%, the space managing device 110 may still determine the PWM to be 90%. This is because in the general implementations, when the allocation rate of the storage pool is greater than 90%, the storage system will automatically stop the space allocation of the storage pool. Therefore, the space release process of the file system needs to be triggered at this time to reclaim some unused portions of allocated spaces.

As shown in FIG. 3, the horizontal axis of the coordinate system in the schematic diagram 300 represents the size of storage space of the storage pool in TB, and the vertical axis represents the threshold allocation rate. A curve 310 shows the variation of the threshold allocation rate. The curve 310 corresponds to the above formulas (1) and (3). It can be seen from the curve 310 that when the storage space of the storage pool becomes larger, the change in the value of the determined threshold allocation rate becomes slower. In this way, the space managing device 110 can set a more reasonable threshold allocation rate for storage pools of different sizes, thereby avoiding unnecessary triggering of the space release process of the file system.

It should be understood that FIG. 3 is shown by way of example only, and does not imply any limitation on the scope of the present disclosure. For example, the threshold allocation rate can also be determined by different formulas. The present disclosure is not limited in this regard.

Returning now to FIG. 2, at 230, in accordance with a determination that the allocation rate of the storage pool is greater than the threshold allocation rate, the space managing device 110 determines a target file system from the plurality of file systems based on sizes of unused portions of the allocated spaces for the plurality of file systems.

As mentioned above, since the space release process of the file system may cause potential DU problems or shaking situation, etc., it is undesired to trigger the space release process too frequently. In the case where the space managing device 110 determines that the allocation rate of the storage pool is not greater than the threshold allocation rate, the storage pool is considered as having sufficient free space, and the space managing device 110 disables the space release operation for all file systems 130 in the storage pool 120.

In the case where the space managing device 110 determines that the allocation rate of the storage pool is greater than the threshold allocation rate, the storage space of the storage pool is considered as being exhausted, and the space managing device 110 should trigger the space release process at this time to reclaim the unused portions of allocated spaces for reallocation.

In some embodiments, the space managing device 110 determines, from the plurality of file systems 130 in the storage pool 120, a target file system that can release space more efficiently with smaller impact on the performance of the storage system.

Additionally, in some embodiments, the space managing device 110 may first obtain information related to the plurality of file systems, and then cluster the plurality of file systems 130 according to the information, resulting in a plurality of file system clusters. Each of the file system clusters indicates different efficiency of space releasing and different impact on performance of the storage system. Next, the space managing device 110 may determine the file system cluster with the most efficient space releasing and smallest impact on the performance of the storage system as the target file system cluster, and determine the target file system from the target file system cluster.

Additionally or alternatively, in some embodiments, the space managing device 110 may determine all the file systems in the target file system cluster as target file systems, and release them together. Additionally or alternatively, in other embodiments, before releasing the target file system, the space managing device 110 may estimate whether the allocation rate of the storage pool will be below the threshold allocation rate after releasing, according to the unused portion of the allocated space for the target file system, if not, select more file systems to release.

Additionally, in some embodiments, the space managing device 110 may exclude, from the plurality of file systems 130, the file system whose usage rate exceeds a predetermined threshold before clustering the plurality of file systems 130, that is, excluding the file system whose percentage of used space to allocated space exceeds a certain threshold. This is because when a file system has a high usage rate, less space can be released by the file system. In addition, in a general implementation, such a file system with a high usage rate will automatically request more allocation space from the storage pool to extend. Therefore, releasing space on such a file system is inefficient and can cause a shaking situation.

The process of determining the target file system will be described in detail below with respect to FIG. 4.

At 240, the space managing device 110 releases an unused portion of an allocated space for the target file system. In some embodiments, the space managing device 110 may monitor the state of the target file system during the space release process of the target file system, thereby updating information related to the target file system. For example, if the space release process of the target file system is interrupted due to automatic extension, the parameter that records the number of interrupts will be incremented. This parameter, which will be described in detail below, can reflect the impact of the space release process of the target file system on the performance of the storage system.

In some embodiments, the space managing device 110 may periodically perform the method 200. Additionally, in an embodiment, the space managing device 110 may execute the method 200 every 7.5 hours.

In the above example embodiments, by considering the entire storage pool rather than individual file systems only, and selecting from the storage pool a file system with more efficient space releasing and smaller impact on the performance of the storage system to release, the efficiency of the space release of the storage system can be improved and the adverse impact of the space release process on the performance of the storage system can be reduced.

Figure 4:
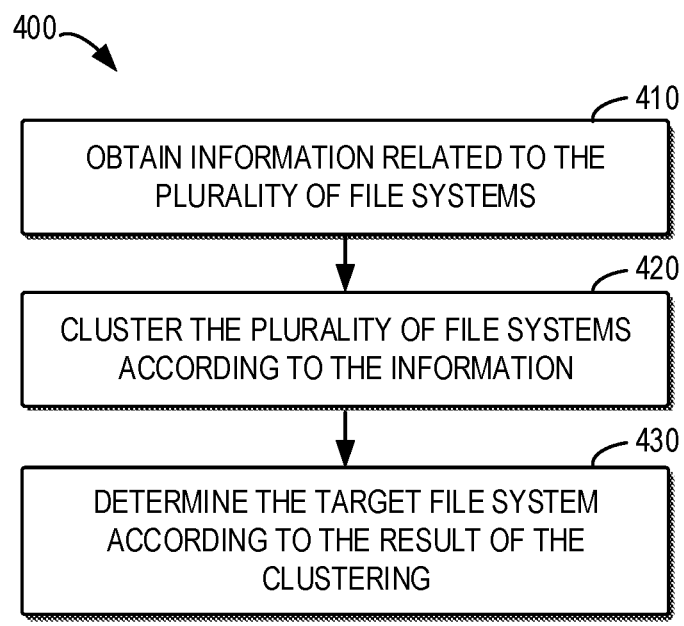
FIG. 4 illustrates a flowchart of an example method of determining a target file system according to embodiments of the present disclosure.

FIG. 4 illustrates a flowchart of an example method 400 of determining a target file system according to embodiments of the present disclosure. The method 400 is an embodiment of block 230 in method 200. For example, the method 400 may be performed by the space managing device 110 shown in FIG. 1. It should be understood that the method 400 may also be performed by other devices, and the scope of the present disclosure is not limited in this regard. It should also be understood that the method 400 may also include additional acts not shown and/or omit acts shown, and the scope of the present disclosure is not limited in this regard.

At 410, the space managing device 110 obtains information related to the plurality of file systems 130.

In some embodiments, the space managing device 110 may obtain the size of the unused portion of the allocated space of each file system. The larger the unused portion, the greater the gap between the used space and the allocated space of the file system. Then, more storage space can be reclaimed by performing a space release operation on such a file system.

Additionally or alternatively, in some embodiments, the space managing device 110 may obtain the number of snapshots and/or snapshot increments for each file system. The larger the number of snapshots of the file system, the greater the impact of the space release process due to block sharing. The larger the increment between snapshots of the file system, the greater the impact on internal IO.

Additionally or alternatively, in some embodiments, the space managing device 110 may obtain the fragmentation rate of each file system. Higher fragmentation rate of the file system indicates that the storage system needs to perform more work to find consecutive free blocks during the space release process for block reallocation.

Additionally or alternatively, in some embodiments, the space managing device 110 may obtain the number of times that a previous release process of the allocated space of each file system was interrupted. A larger number of times indicate more shaking situations occurred.

Additionally or alternatively, in some embodiments, the space managing device 110 may obtain the replication state information of each file system, that is, whether the file system is replicated. If a replication is created for this file system, an internal/systematic snapshot will be created, and the storage system needs to perform more work to release the space.

At 420, the space managing device 110 clusters the plurality of file systems according to the information.

In some embodiments, the space managing device 110 may represent each file system with a set of parameters, e.g., a feature vector, according to the obtained information. For example, the space managing device 110 may use $V_{ishrink}/P_i$, $V_{isnap}$, $V_{isnapdelta}$, $V_{ifrag}$, and $R_i$ to represent each file system, where $V_{ishrink}$ represents the normalized size of the unused portion of the allocated space, that is, the ratio of the size of unused portion of allocated space of an individual file system to the size of the largest unused portion of the allocated spaces of a plurality of file systems; $V_{isnap}$ represents the normalized number of snapshots, that is, the ratio of the number of snapshots of an individual file system to the maximum number of snapshots of a plurality of file systems; $V_{isnapdelta}$ represents the normalized snapshot increment, that is, the ratio of the total snapshot increment of an individual file system to the maximum total snapshot increment of a plurality of file systems; $V_{ifrag}$ represents the normalized fragmentation rate, i.e. the ratio of the fragmentation rate of an individual file system to the maximum fragmentation rate of a plurality of file systems; $R_i$ represents the replication state of the file system, 0 means it is not replicated, and 1 means it is replicated; $P_i$ represents the number of times the space release process was interrupted, and the initial value is 1.

Then, the space managing device 110 may cluster the plurality of file systems using reinforcement learning methods according to the feature vectors representing respective file systems. Reinforcement learning method is an unsupervised machine learning method. In some embodiments, the space managing device 110 may use K-means clustering algorithm, K-means++ clustering algorithm, and other reinforcement learning methods to cluster the plurality of file systems.

It should be understood that the information and feature vectors related to the file system are described by way of example only, and do not imply any limitation on the scope of the present disclosure. For example, it is also possible to cluster a plurality of file systems by using more, less or other information and feature vectors. The present disclosure is not limited in this regard.

Figure 5:
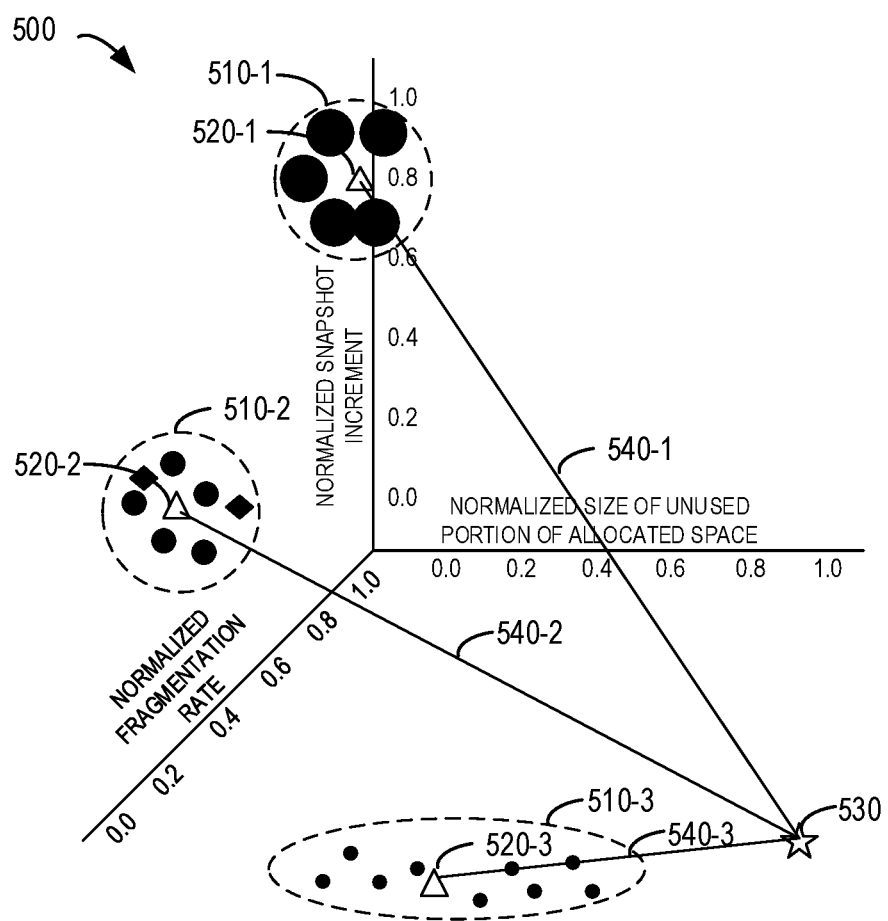
FIG. 5 illustrates a schematic diagram of a result of clustering a plurality of file systems according to embodiments of the present disclosure.

FIG. 5 illustrates a schematic diagram of a result of clustering a plurality of file systems according to embodiments of the present disclosure. As shown in FIG. 5, each file system can be represented by its corresponding three-dimensional coordinate value, shape and size. After clustering the plurality of file systems, the plurality of file systems are divided into three file system clusters 510-1, 510-2 and 510-3, the central coordinate points of these three file system clusters are 520-1, 520-2 and 520-3, respectively, which are represented by triangles.

Now returning to FIG. 4, at 430, the space managing device 110 determines the target file system according to the result of the clustering.

Still referring to FIG. 5, in FIG. 5, a point 530 represents a predetermined ideal coordinate point, which corresponds to the ideal file system for the space release process, that is, the file system which releases more unused portion of the allocated space and have less impact on the storage system performance, for example, less internal IO consumption, less risk of DU problems, etc. In some embodiments, the predetermined ideal coordinate point is set as $V_{ishrink}=1$, $V_{isnap}=0$, $V_{isnapdelta}=0$, $V_{ifrag}=0$, $R_1=0$ and $P_i=1$. The space managing device 110 may calculate the Euclidean distance $L_i$ between the center coordinate point of each file system cluster and the ideal coordinate point according to the following formula (5):

$$L_i = \sqrt{\left(\frac{V_{ishrink}}{P_i} - 1\right)^2 + (V_{isnap} - 0)^2 + (V_{isnapdelta} - 0)^2 + (V_{ifrag} - 0)^2 + (R_i - 0)^2} \quad (5)$$

then sort the calculated distances, and determine the file system cluster corresponding to the shortest distance as the target file system cluster. For example, as shown in FIG. 5, the file system cluster 510-3 may be determined as the target file system cluster.

As mentioned in the above description to 230, in some embodiments, the space management device 110 may select a target file system from the target file system cluster to release.

Additionally or alternatively, in other embodiments, the space management device 110 may determine all of the file systems in the target file system cluster as target file systems to release together.

Additionally or alternatively, in still other embodiments, before releasing the target file system, the space management device 110 may estimate whether the allocation rate of the storage pool will be below the threshold allocation rate after release according to the size of the unused portion of the allocated space of the target file system. If not, select more file systems to release. For example, as shown in FIG. 5, if the space management device 110 estimates that after the file system cluster 510-3 is released, the allocation rate of the storage pool is still above the threshold allocation rate, then select more file systems from the file system cluster corresponding to the second shortest distance, e.g., file system cluster 510-2 in FIG. 5, to release.

An example implementation is described below. In this example implementation, the space managing device 110 determines that the allocation rate of the storage pool is greater than the threshold allocation rate. In this storage pool, there are 99 file systems in different conditions. The percentages of used spaces and allocated spaces of these file systems are all less than a predetermined threshold. Table 1 below shows various information of 10 of these file systems.

TABLE 1

| file system numbering | unused portion of allocated space (GB) | number of snapshots | snapshot increment (GB) | fragmentation rate | times of interruptions | replication state |
|---|---|---|---|---|---|---|
| 89 | 902 | 7 | 40 | 0.044411 | 7 | 0 |
| 90 | 2 | 206 | 963 | 0.906690 | 95 | 1 |
| 91 | 908 | 5 | 9 | 0.097034 | 6 | 0 |
| 92 | 74 | 239 | 879 | 0.912652 | 95 | 1 |
| 93 | 930 | 0 | 26 | 0.035175 | 6 | 0 |
| 94 | 32 | 208 | 833 | 0.878422 | 100 | 1 |
| 95 | 4 | 220 | 899 | 0.938932 | 100 | 1 |
| 96 | 59 | 203 | 835 | 0.855566 | 97 | 1 |
| 97 | 447 | 108 | 318 | 0.430942 | 55 | 1 |
| 98 | 95 | 213 | 996 | 0.824892 | 94 | 1 |

According to the information related to the file systems as shown in Table 1, the feature vectors of various file systems can be determined. Table 2 below shows the 5-dimensional feature vector of these 10 file systems.

TABLE 2

| file system numbering | $V_{ishrink}/P_i$ | $V_{isnap}$ | $V_{isnapdelta}$ | $V_{ifrag}$ | $R_i$ |
|---|---|---|---|---|---|
| 89 | 0.126455 | 7 | 0.040 | 0.044459 | 0.0 |
| 90 | 0.000021 | 206 | 0.963 | 0.907683 | 1.0 |
| 91 | 0.148512 | 5 | 0.009 | 0.097140 | 0.0 |
| 92 | 0.000764 | 239 | 0.879 | 0.913652 | 1.0 |
| 93 | 0.152110 | 0 | 0.026 | 0.035214 | 0.0 |
| 94 | 0.000314 | 208 | 0.833 | 0.879384 | 1.0 |
| 95 | 0.000039 | 220 | 0.899 | 0.939960 | 1.0 |
| 96 | 0.000597 | 203 | 0.835 | 0.856504 | 1.0 |
| 97 | 0.007976 | 108 | 0.318 | 0.431414 | 1.0 |
| 98 | 0.000992 | 213 | 0.996 | 0.825795 | 1.0 |

By using the K-means clustering algorithm for these file systems, three file system clusters shown schematically in FIG. 5 can be obtained. Table 3 below shows the value of the center coordinate point of each file system cluster.

TABLE 3

| file system cluster numbering | $V_{ishrink}/P_i$ | $V_{isnap}$ | $V_{isnapdelta}$ | $V_{ifrag}$ | $R_i$ |
|---|---|---|---|---|---|
| a | 0.00 | 220.606 | 0.916 | 0.902 | 1.000 |
| b | 0.47 | 4.545 | 0.023 | 0.055 | 0.000 |
| c | 0.01 | 121.970 | 0.399 | 0.500 | 0.455 |

Then, the space managing device 110 can calculate the distance between each file system cluster and the "ideal file system" as follows:

$$L_a = \sqrt[2]{(0.00-1)^2 + (220.606-0)^2 + (0.916-0)^2 + (0.902-0)^2 + (1.000-0)^2} = 220.614 \quad (6)$$

$$L_b = \sqrt[2]{(0.47-1)^2 + (4.545-0)^2 + (0.023-0)^2 + (0.055-0)^2 + (0.000-0)^2} = 4.576 \quad (7)$$

$$L_c = \sqrt[2]{(0.01-1)^2 + (121.970-0)^2 + (0.399-0)^2 + (0.500-0)^2 + (0.455-0)^2} = 121.973 \quad (8)$$

Since $L_b < L_c < L_a$, the space managing device 110 first selects the file system cluster b to perform the space release operation. If the allocation rate of the storage pool is still higher than the threshold allocation rate after the release, the space managing device 110 selects the file system cluster c to continue the space release operation. After the space release process, the space managing device 110 may increase the value of $P_i$ by 1 for the file system whose space release process was interrupted due to auto extend, and decrease the value of $P_i$ by 1 for the file system whose space release process was completed without any interrupt.

It should be understood that FIG. 5 and Tables 1 to 3 are shown by way of example only, and do not imply any limitation to the scope of the present disclosure. For example, a plurality of file systems can be clustered into a larger number or a smaller number of file system clusters; other coordinate points can be used as ideal coordinate points. The present disclosure is not limited in these regards.

In the above example embodiments, by clustering a plurality of file systems using a reinforcement learning method such as a K-means clustering algorithm, it is possible to efficiently find out, from the plurality of file systems, a file system with high space release efficiency and less impact on the performance of the storage system, without affecting other operations of the storage system due to increased amount of calculation.

Figure 6:
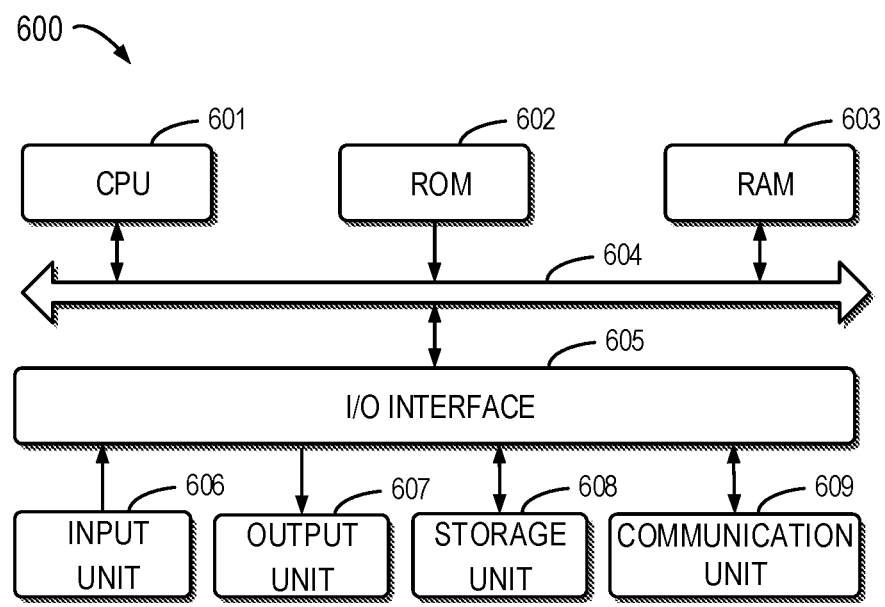
FIG. 6 illustrates a schematic block diagram of an example electronic device for implementing embodiments of the present disclosure.

FIG. 6 illustrates a schematic block diagram of an example electronic device 600 for implementing embodiments of the present disclosure. For example, the space managing device 110 shown in FIG. 1 can be implemented by the electronic device 600. As shown in FIG. 6, the electronic device 600 includes a central processing unit (CPU) 601, which can execute various suitable acts and processing based on the computer program instructions stored in the read-only memory (ROM) 602 or computer program instructions loaded in the random-access memory (RAM) 603 from a storage unit 608. The RAM 603 can also store all kinds of programs and data required by the operations of the electronic device 600. CPU 601, ROM 602 and RAM 603 are connected to each other via a bus 604. The input/output (I/O) interface 605 is also connected to the bus 604.

A plurality of components in the electronic device 600 are connected to the I/O interface 605, including: an input unit 606, such as keyboard, mouse and the like; an output unit 607, e.g., various kinds of display and loudspeakers etc.; a storage unit 608, such as magnetic disk and optical disk etc.; and a communication unit 609, such as network card, modem, wireless transceiver and the like. The communication unit 609 allows the device 600 to exchange information/data with other devices via the computer network, such as Internet, and/or various telecommunication networks.

Various processes and processing described above, such as the method 200 and 400, can also be executed by the processing unit 601. For example, in some embodiments, the method 200 and 400 can be implemented as a computer software program tangibly included in the machine-readable medium, e.g., storage unit 608. In some embodiments, the computer program can be partially or fully loaded and/or mounted to the device 600 via ROM 602 and/or communication unit 609. When the computer program is loaded to RAM 603 and executed by the CPU 601, one or more steps of the above described method 200 and 400 can be implemented.

The present disclosure can be a method, apparatus, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, an electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combination of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including a local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of a general-purpose computer, dedicated computer or other programmable data processing apparatuses to manufacture a machine, such that the instructions, when executed by the processing unit of the computer or other programmable data processing apparatuses, generate an apparatus for implementing functions/acts stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/acts stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/acts stipulated in one or more blocks of the flow chart and/or block diagram.

The flow chart and block diagram in the drawings illustrate system architecture, functions and operations that may be implemented by system, method and computer program products according to a plurality of implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or acts, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious to those skilled in the art. The selection of terms in the text aims to best explain principles and actual applications of each implementation and technical improvements made in the market by each embodiment, or enable others of ordinary skill in the art to understand implementations of the present disclosure.

We claim:

1. A method of managing storage spaces, comprising:
    determining an allocation rate of a storage pool based on a size of a storage space of the storage pool and sizes of allocated spaces for a plurality of file systems from the storage space;
    determining a threshold allocation rate of the storage pool based on the size of the storage space of the storage pool;
    in accordance with a determination that the allocation rate of the storage pool is greater than the threshold allocation rate, determining a target file system from the plurality of file systems based on sizes of unused portions of the allocated spaces for the plurality of file systems; and releasing an unused portion of an allocated space for the target file system;
wherein determining the allocation rate of a storage pool includes:
identifying corresponding sizes of spaces allocated to file systems in the plurality of file systems from the storage space;
calculating a sum of the corresponding sizes; and
generating the allocation rate by calculating a ratio of the sum of the corresponding sizes to the size of the storage space.

2. The method of claim 1, wherein determining the threshold allocation rate of the storage pool comprises:
in accordance with a determination that the size of the storage space is not greater than a first space threshold, setting the threshold allocation rate as a first predetermined threshold; and
in accordance with a determination that the size of the storage space is greater than the first space threshold, determining the threshold allocation rate in association with the size of the storage space.

3. The method of claim 2, further comprising:
in accordance with a determination that the threshold allocation rate is greater than a second predetermined threshold, determining the threshold allocation rate as the second predetermined threshold, the second predetermined threshold being greater than the first predetermined threshold.

4. The method of claim 1, wherein determining the target file system comprises:
obtaining information related to the plurality of file systems;
clustering the plurality of file systems based on the information; and
determining the target file system based on a result of the clustering.

5. The method of claim 4, wherein obtaining the information related to the plurality of file systems comprises obtaining, for each of the plurality of file systems, at least one of the following:
a size of an unused portion of an allocated space, a number of snapshots, a snapshot increment, a fragmentation rate, a replication state, and a number of times that a previous release process of an allocated space was interrupted.

6. The method of claim 4, wherein clustering the plurality of file systems comprises:
clustering the plurality of file systems based on a reinforcement learning method.

7. The method of claim 4, wherein determining the target file system based on the result of the clustering comprises:
determining a plurality of file system clusters based on the result of the clustering;
mapping the plurality of file system clusters to a plurality of coordinate points;
determining a target file system cluster from the plurality of file system clusters based on distances between the plurality of coordinate points and a predetermined coordinate point; and
determining the target file system from the target file system cluster.

8. The method of claim 1, wherein releasing the unused portion of the allocated space for the target file system includes initiating a space release process of the target file system, and wherein the method further includes:
receiving, after initiating the space release process, a request to extend a size of space allocated to the target file system; and
interrupting the space release process.

9. The method of claim 1, further comprising:
before releasing the unused portion of the allocated space for the target file system, generating an estimated allocation rate after releasing the unused portion;
in response to identifying that the estimated allocation rate is greater than the threshold allocation rate, selecting a second target file system from the plurality of file systems; and
releasing an unused portion of space allocated to the second target file system.

10. The method of claim 1, wherein determining the target file system includes:
using a K-means clustering algorithm to organize the plurality of file systems into multiple file system clusters; and
selecting, from the multiple file system clusters, a file system cluster that is closest to a predetermined ideal file system, and
wherein releasing the unused portion of the allocated space for the target file system includes performing a space release operation on the selected file system cluster.

11. An electronic device, comprising:
at least one processing unit; and
at least one memory coupled to the at least one processing unit and storing instructions for execution by the at least one processing unit, the instructions, when executed by the at least one processing unit, causing the electronic device to perform acts, the acts comprising:
determining an allocation rate of a storage pool based on a size of a storage space of the storage pool and sizes of allocated spaces for a plurality of file systems from the storage space;
determining a threshold allocation rate of the storage pool based on the size of the storage space of the storage pool;
in accordance with a determination that the allocation rate of the storage pool is greater than the threshold allocation rate, determining a target file system from the plurality of file systems based on sizes of unused portions of the allocated spaces for the plurality of file systems; and
releasing an unused portion of an allocated space for the target file system;
wherein determining the allocation rate of the storage pool includes:
generating, as the allocation rate, a ratio of (i) a sum of corresponding sizes of spaces allocated to file systems in the plurality of file systems from the storage space to (ii) the size of the storage space.

12. The electronic device of claim 11, wherein determining the threshold allocation rate of the storage pool comprises:
in accordance with a determination that the size of the storage space is not greater than a first space threshold, setting the threshold allocation rate as a first predetermined threshold; and
in accordance with a determination that the size of the storage space is greater than the first space threshold, determining the threshold allocation rate in association with the size of the storage space.

13. The electronic device of claim 12, wherein the acts further comprise:

in accordance with a determination that the threshold allocation rate is greater than a second predetermined threshold, determining the threshold allocation rate as the second predetermined threshold, the second predetermined threshold being greater than the first predetermined threshold.

14. The electronic device of claim 11, wherein determining the target file system comprises:

obtaining information related to the plurality of file systems;

clustering the plurality of file systems based on the information; and determining the target file system based on a result of the clustering.

15. The electronic device of claim 14, wherein obtaining the information related to the plurality of file systems comprises obtaining, for each of the plurality of file systems, at least one of the following:

a size of an unused portion of an allocated space, a number of snapshots, a snapshot increment, a fragmentation rate, a replication state, and a number of times that a previous release process of an allocated space was interrupted.

16. The electronic device of claim 14, wherein clustering the plurality of file systems comprises:

clustering the plurality of file systems based on a reinforcement learning method.

17. The electronic device of claim 14, wherein determining the target file system based on the result of the clustering comprises:

determining a plurality of file system clusters based on the result of the clustering;

mapping the plurality of file system clusters to a plurality of coordinate points;

determining a target file system cluster from the plurality of file system clusters based on distances between the plurality of coordinate points and a predetermined coordinate point; and determining the target file system from the target file system cluster.

18. A computer program product having a non-transitory computer readable medium which stores a set of instructions to manage storage spaces; the set of instructions, when carried out by computerized circuitry, causing the computerized circuitry to perform a method of:

determining an allocation rate of a storage pool based on a size of a storage space of the storage pool and sizes of allocated spaces for a plurality of file systems from the storage space;

determining a threshold allocation rate of the storage pool based on the size of the storage space of the storage pool;

in accordance with a determination that the allocation rate of the storage pool is greater than the threshold allocation rate, determining a target file system from the plurality of file systems based on sizes of unused portions of the allocated spaces for the plurality of file systems; and releasing an unused portion of an allocated space for the target file system;

wherein determining the allocation rate of the storage pool includes:

generating, as the allocation rate, a ratio of (i) a sum of corresponding sizes of spaces allocated to file systems in the plurality of file systems from the storage space to (ii) the size of the storage space.

19. A method of managing storage spaces, comprising:

determining an allocation rate of a storage pool based on a size of a storage space of the storage pool and sizes of allocated spaces for a plurality of file systems from the storage space;

determining a threshold allocation rate of the storage pool based on the size of the storage space of the storage pool;

in accordance with a determination that the allocation rate of the storage pool is greater than the threshold allocation rate, determining a target file system from the plurality of file systems based on sizes of unused portions of the allocated spaces for the plurality of file systems; and releasing an unused portion of an allocated space for the target file system;

wherein determining the target file system comprises:

obtaining information related to the plurality of file systems;

clustering the plurality of file systems based on the information; and determining the target file system based on a result of the clustering.

20. The method of claim 19, wherein clustering the plurality of file systems comprises:

clustering the plurality of file systems based on a reinforcement learning method.

* * * * *